United States Patent
Larkin

[11] 3,828,447
[45] Aug. 13, 1974

[54] EDUCATIONAL DEVICE
[76] Inventor: David L. Larkin, 1200 W. Michigan Ave., Battle Creek, Mich. 49017
[22] Filed: Aug. 22, 1973
[21] Appl. No.: 390,397

[52] U.S. Cl. ............................................. 35/9 R
[51] Int. Cl. ........................................... G09b 3/00
[58] Field of Search .............................. 35/8 R, 9 R

[56] References Cited
UNITED STATES PATENTS

| | | | |
|---|---|---|---|
| 2,312,773 | 3/1943 | Palmer | 35/9 R |
| 2,892,267 | 6/1959 | Harvey | 35/9 R X |
| 3,362,103 | 1/1968 | Neumann | 35/9 R X |
| 3,613,261 | 10/1971 | Petty | 35/8 R |

*Primary Examiner*—Wm. H. Grieb
*Attorney, Agent, or Firm*—Samuel Kurlandsky; Roy A. Plant

[57] ABSTRACT

An educational device, comprising a base supporting a spindle and several discs mounted over the spindle, the lower disc having a plurality of recessed receptacles or sockets arranged in a circle concentric with the spindle, and having question indicia associated with each receptacle, and having on the upper surface of the disc verified answer indicia associated with each socket or receptacle, the second disc having a diameter sufficiently large to cover the verified answer indicia, and in an improved embodiment arranged to cover partially the receptacles, and a plurality of tablets such as discs each containing proposed answer indicia adapted to be inserted one into each receptacle.

9 Claims, 7 Drawing Figures

PATENTED AUG 13 1974

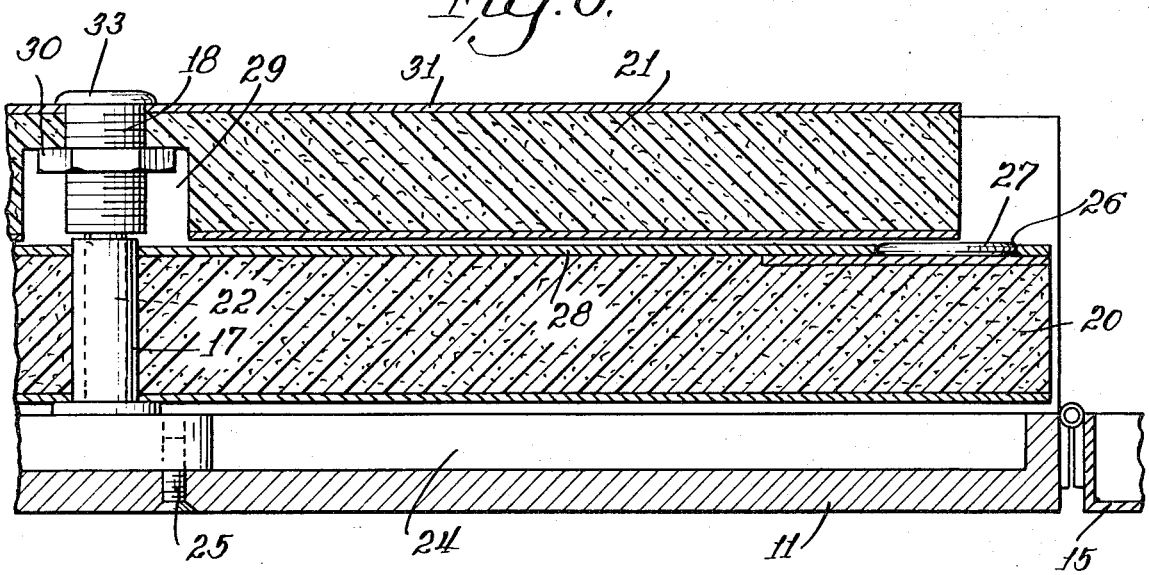
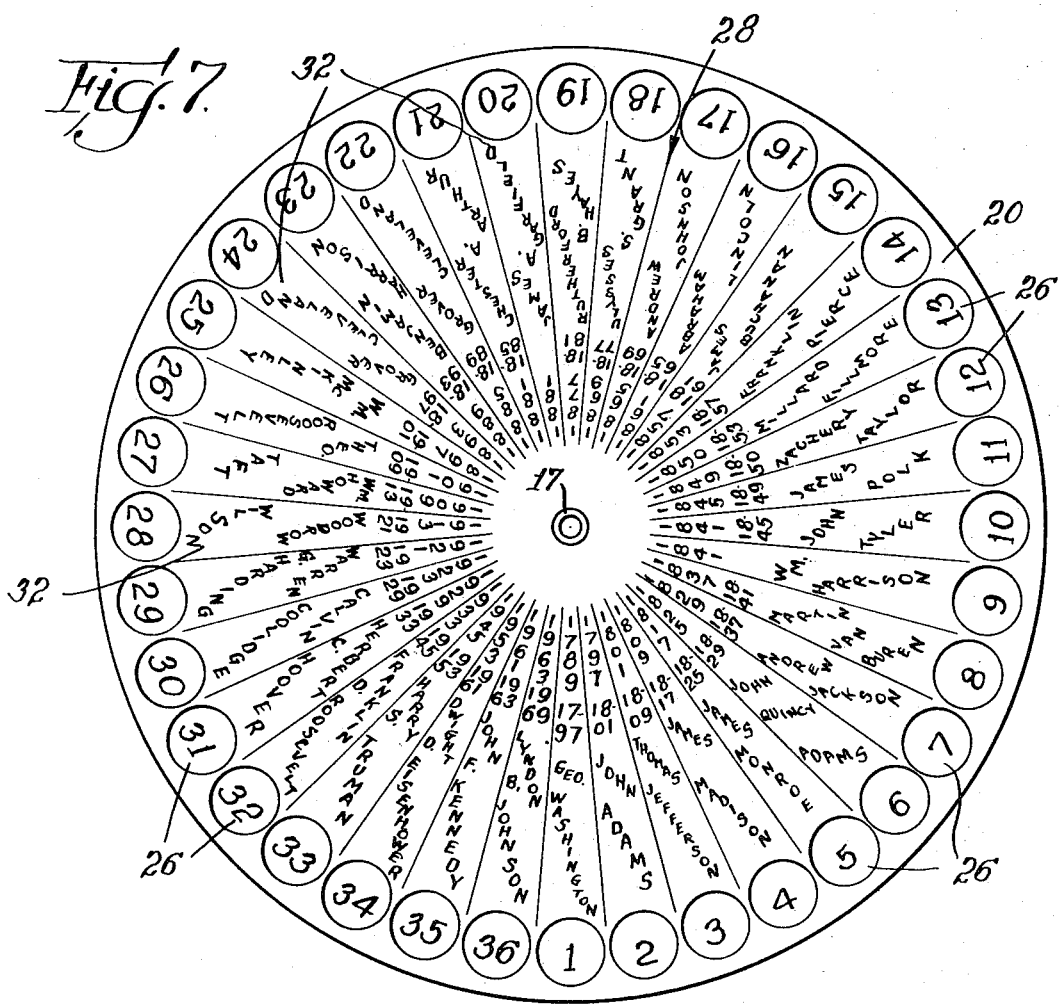

EDUCATIONAL DEVICE

BACKGROUND OF THE INVENTION

1. Field of the Invention.

The present invention relates to educational devices and is more particularly concerned with an educational device which may be utilized to teach students, children as well as adults, various types of information, as for example the names of the Presidents and the ordinal number of their term, by providing the device in the form of a game to draw the interest of the players.

2. Prior Art.

Many games and educational devices have been developed and disclosed in the prior art. In many educational devices, flash cards are utilized to teach students various fact relationships. Such methods require a great deal of repetition and are not always successful, since the interest and concentration span of the subject is lost after a short period of time. Moreover, such devices do not provide means for a teacher to assign the device to be used by the student at home, while preventing the student from gaining access to the verified answers.

OBJECTS OF THE INVENTION

It is accordingly an object of the present invention to provide a new and improved educational device particularly useful in teaching students various types of information.

It is another object to provide an educational device of the type described which may be utilized in the form of a game to increase and to maintain the interest of the participants.

It is still another object to provide an educational device which can be utilized to teach information about United States Presidents, including the date and ordinal order of their terms.

It is a further object to provide an educational device in which the ultimate verified answers may be withheld from the participants until the device is subsequently opened or activated by the instructor.

It is another object to provide an educational device which may be readily and inexpensively constructed and which is simple enough to be utilized even by young children.

Still other objects will readily present themselves to one skilled in the art upon reference to the ensuing specification, the drawings, and the claims.

According to the invention, an educational device is provided comprising a base supporting a vertical spindle and having two discs rotatably mounted thereon, one disc having a plurality of sockets associated with question indicia arranged in a circle for the placement of tablets such as pellets containing proposed answer indicia, and having ultimate or verified answer indicia in association with each socket. A second disc, smaller than the lower disc, is also mounted on the spindle to cover the verified answer indicia of the disc below, and in addition partly cover the sockets in order to retain tablets such as discs inserted therein. Additionally, in an improved form a locking means is provided to be mounted over the spindle to prevent the student or participant from having access to the verified answers, which lock may be subsequently opened by the teacher having a key to correct the proposed answers provided by the student. When utilized to teach students information about American Presidents, the names, pictures and dates of office of the Presidents may be placed on the discs, the discs then to be inserted in the sockets displaying the number which represents the ordinal number of the President's term. This is verified when the upper disc is subsequently removed.

BRIEF DESCRIPTION OF THE DRAWINGS

In the drawings,

FIG. 6 is a fragmentary cross-sectional view taken at the line 6—6 of FIG. 5, looking in the direction of the arrows, and FIG. 7 is a plan view of the lower disc with the upper disc removed.

DESCRIPTION OF THE PREFERRED EMBODIMENT

Figure 1:
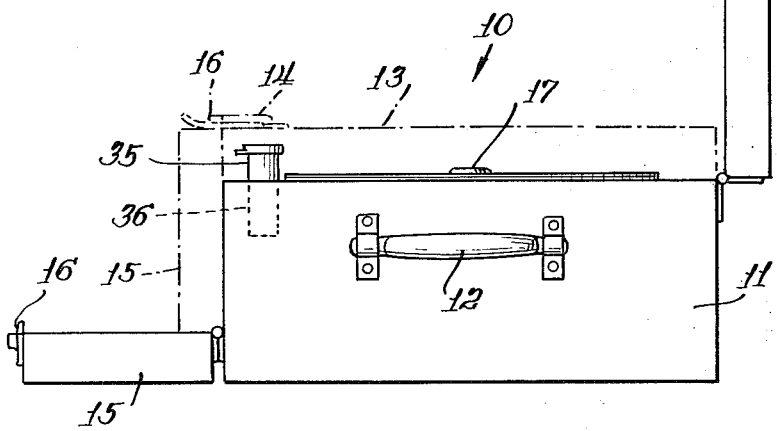
FIG. 1 is a side elevational view of the educational device of the invention.
Figure 3:
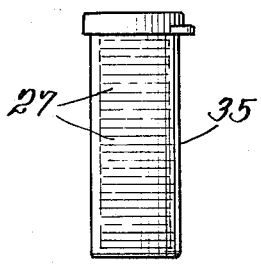
FIG. 3 is a side elevational view of a container utilized with the apparatus.
Figure 2:
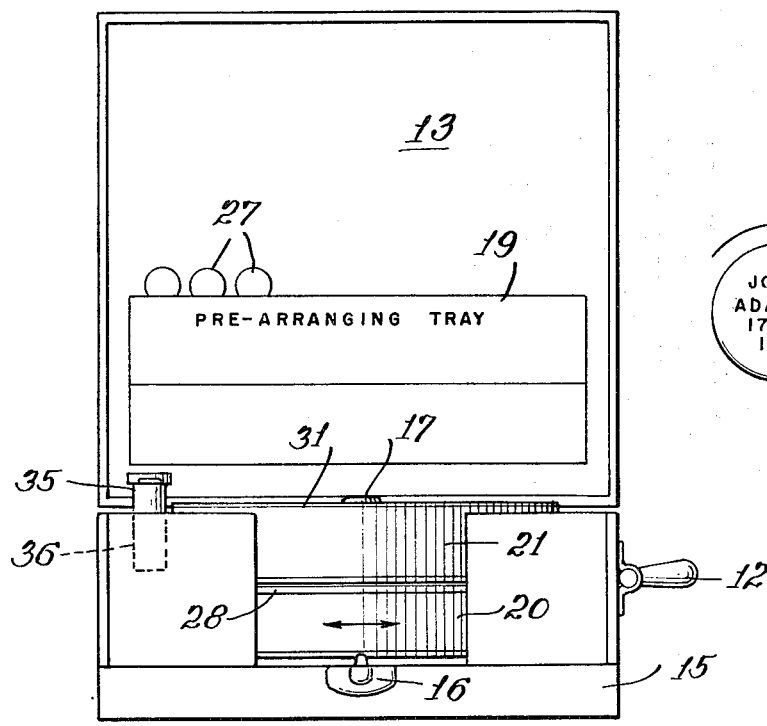
FIG. 2 is a front elevational view of the device shown in FIG. 1.

Referring to FIGS. 1, 2, 3 and 5, the educational device 10 is shown comprising a case 11 having a handle 12, a top cover 13 hingedly mounted on the case 11, and having a latch member 14. A front cover 15 is hingedly mounted on the case 11 and is provided with a latch member 16 complementary to the latch member 14.

As shown in greater detail in FIG. 6, a lower spindle member 17 is mounted on a base member 24 which is affixed to the bottom of the case 11 by screws 25. An upper spindle member 18 having a lock 33 provided therein is threadedly engaged on a shaft 22 journaled in an axial channel of the lower spindle member 17. A tray 19 may be provided to retain and display the discs 27.

Figure 4:
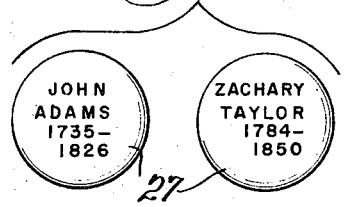
FIG. 4 is a plan view of tablets such as discs bearing proposed answer indicia.

Rotatably mounted on the lower spindle member 17 is a first or lower disc 20. A second or upper disc 21 is mounted on the upper spindle member 18, FIG. 6. The upper disc 21 may be provided with a recess 29 having a locking nut 30 engaging the disc 21 and affixing it to the upper spindle member 18. The lower disc 20 is provided with sockets 26 arranged in a circle coaxial with the spindle member 17 and having question indicia such as numerals provided therein. The sockets 26 are adapted to receive and retain tablets such as discs 27 therein, which discs have proposed answers provided thereon (FIG. 4). A verified answer indicia disc 28 of lithographed paper or fabric is affixed adhesively to the upper surface of the lower disc 20.

Figure 5:
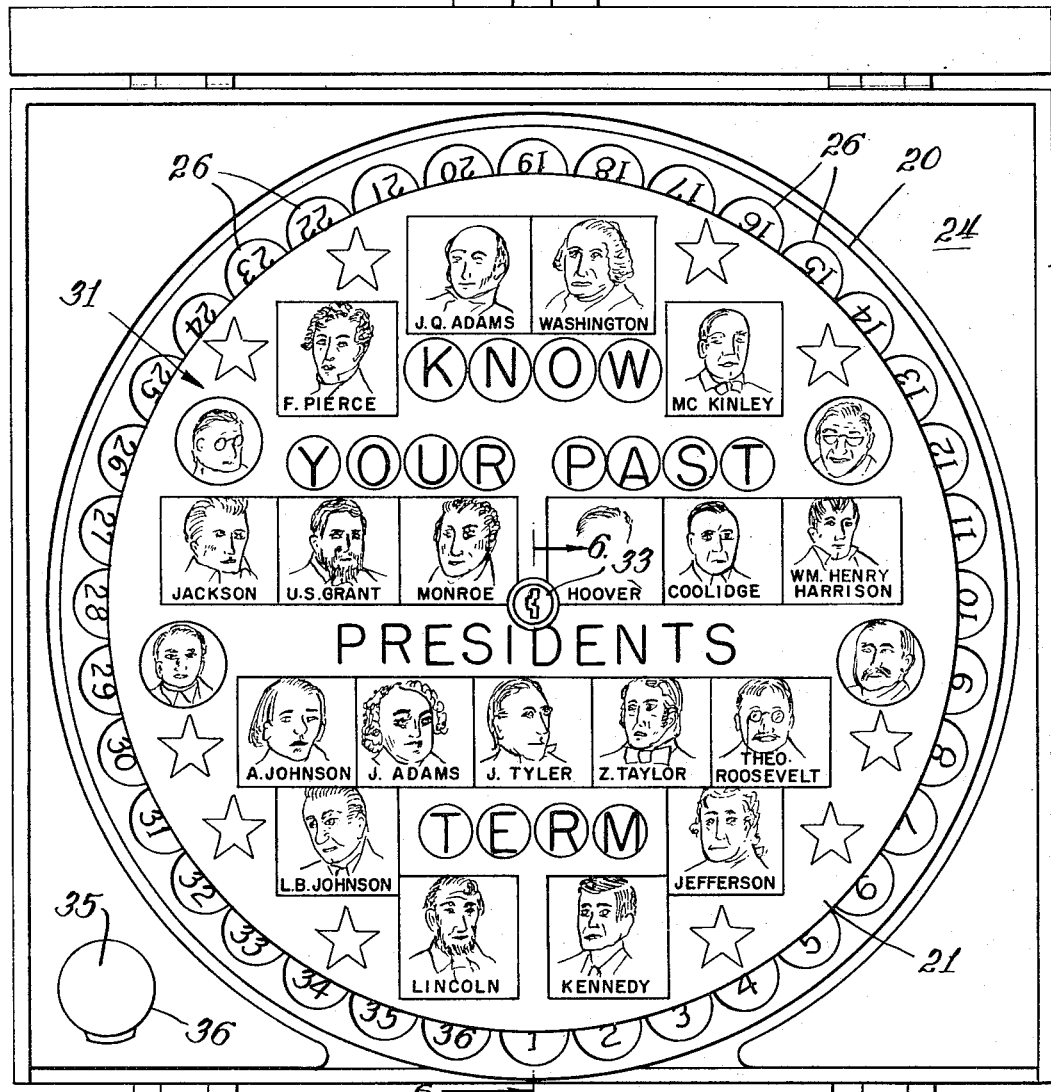
FIG. 5 is a top view of the apparatus with the cover in open position.

Referring to FIG. 5, a top view is shown of the educational device with both discs 20 and 21 in place and the upper spindle member 18 locked in place by means of a lock 33. A lithographed disc or sheet 31 of paper, fabric or plastic material is affixed to the upper surface of the upper disc 21 and contains designs, instructional material and illustrative material. An instruction sheet 34 may be affixed to the front cover 15. A transparent cylindrical container 35 is provided for storing the discs 27.

FIG. 7 illustrates the lower disc 20 after the upper disc 21 has been removed. In addition to the sockets 26 which have a series of numerals provided therein in the embodiment shown, the disc 20 additionally has a lithographed sheet or disc 28 of paper, fabric or plastic on which are imprinted radial sectors 32 each containing a verified answer corresponding to the question posed by the adjacent numeral. The relative sizes of the discs 20 and 21 are such that when the upper disc 21 is in place, it covers a substantial portion of, and preferably about one-half of, each socket 26, thereby serving to retain the proposed answer discs 27 in place after they have been inserted into the sockets 26.

As arranged in the embodiment shown in the drawings, the numerals appearing in the sockets 26 pose questions which refer to the ordinal numbers of the terms of the Presidents of the United States. Alternatively, the numerals may appear adjacent the sectors or in other visible areas such as on the axial wall of the disc or in any other position such as in an extended border radially external to the sockets. The numerals are denoted herein as the question indicia, that is, they ask the question as to which President's term is associated with that ordinal numeral, for example with respect to the numeral "1," who was the first President. Radially inwardly of the sockets 26 are the verified answer sectors 32 associated with each socket which give the name of the President having the particular term designated by the numeral in the adjacent socket. When the upper disc 21 is in place, the verified answer sectors are completely obscured from the vision of the operator. The proposed answer discs 27 in the embodiment shown contain information as to the names of the Presidents, and if desired, the dates of the period of their administrations. Additionally, a photograph or sketch of each President may appear either on the proposed answer discs or in the verified answer segment to acquaint the student with the appearance of the President.

In utilizing the educational device as shown in conjunction with the learning of information as to the Presidents, the student picks up a disc 27 and observes the name of the President imprinted thereon. He then inserts the disc in a socket 27 having a numeral associated therewith corresponding to the ordinal number of the term of the President named on the disc. He then continues to place the remainder of the discs 27 in the various sockets, and to the best of his ability matching the Presidents named on all the discs with the number of their term associated with the sockets. When all the discs have been inserted, at least to the best of the ability of the student, the supervisor then removes the top disc 21 to expose the verified answer sectors 32. The names of the Presidents imprinted on the discs are then checked for correspondence with the names of the Presidents and any additional information contained in the verified answer sectors corresponding to the particular socket in which the disc is placed.

If desired, the device may be given to the student to take home and the work may be done at home. The relationship of the two discs 20 and 21 is so designed that the upper disc assists in holding the proposed answer discs 27 in place even though the apparatus may be tilted to its side. The key to the lock 33 is retained by the instructor to prevent access by the student to the verified answers contained in the sectors on the surface of the lower disc. When the student returns the device to the instructor, the instructor may then utilize his key to remove the upper disc and thereby to expose the verified answers. He then can check the proposed answers on the discs 27 with the verified answers contained in the radial sectors.

The educational device has been shown and described in the form in which question indicia are provided in conjunction with the sockets and proposed answer indicia provided on the tablets such as discs 27. Alternatively, question indicia may be provided on the discs 27 and proposed answer indicia provided in combination with the sockets 26.

Further, although the educational device of the present invention has been shown and described specifically in the embodiment in which it may be used to teach information about United States Presidents, the device can, of course, be used in many other fields of teaching and to teach many broad subjects. In devising other uses, it is necessary first of all to provide question indicia associated with each socket either in the form of actual questions or in the form of symbols such as numbers and letters which refer to concepts or written questions. For example, in the game shown, a numeral is associated with each socket which in effect poses the question as to who was the first or second or third, etc., President. Alternatively, a question could be inscribed within or adjacent to the socket. In another form, numbers or letters may be utilized to refer to numbered or lettered questions in a list of questions which may be supplied on a sheet of paper.

Second, it is necessary that the space radially inwardly of each socket, as for example the radial sectors shown in the drawings, be provided with the true or verified answers to the questions posed. For example, in the drawings, the numerals pose questions as to what is the ordinal number of succession of term, or for example, what President was the second or third or fourth, etc., President of the United States. The verified information indicia would then have the name of the President corresponding to the numeral associated with the socket, for example, associated with socket 1 would be the name "George Washington" together with any additional information which is desired to be given.

Third, it is necessary to provide proposed answer indicia on the tables or discs. In the form shown this comprises the name of the President and/or his picture. Alternatively, other proposed answer indicia may be provided. In a further embodiment, the discs may be colored with one color on one face and with another on another face, the colors connoting true or false. The discs may also have numerals or letters referring to answers provided separately on a written sheet of paper. It will thus be seen that almost innumerable forms of learning may be utilized with the present educational device.

The educational device may be made of various materials and forms. In the drawings the device has been shown mounted in a case or compartment. This makes the device convenient for transporting, as when the device is assigned to be used in the home of the student. Alternatively, the device may be merely mounted on a base such as a piece of plywood or masonite. The discs may be formed of any of a number of materials such as plywood or plastic, although sheets of polystyrene foam have been found to be advantageous since they are light and sufficiently strong. A lock such as that shown or any other type may be utilized if desired when the device is to be assigned for home use and the answers to be verified upon return. Alternatively, the device may be utilized without a lock.

It is to be understood that the invention is not to be limited to the exact details of operation or structures shown and described, as obvious modifications and equivalents will be apparent to one skilled in the art.

I claim:
1. An educational device, comprising:
 1. a base,
 2. a vertical spindle mounted on said base,
 3. a first disc rotatably mounted at its center over said spindle having a plurality of sockets arranged in a circle concentric with said spindle on the upper surface of said disc at the periphery thereof, each of said sockets having question indicia associated therewith, the upper surface of said first disc additionally having verified answer indicia provided thereon radially inward of and associated with each of said sockets,
 4. a second disc rotatably mounted on said spindle over said first disc of sufficient diameter to cover said verified answer indicia, and
 5. a plurality of tablet means adapted to be inserted one in each of said sockets, and having provided thereon proposed answer indicia.
2. An educational device according to claim 1, wherein said sockets are substantially cylindrical and said tablet means are answer discs adapted to fit into said sockets.
3. An educational device according to claim 2, wherein said second disc covers a substantial proportion of each socket, thereby retaining answer discs inserted in said sockets during movement of said device.
4. An educational device according to claim 3, wherein said second disc covers at least half of each answer disc when said discs are inserted in said sockets.
5. An educational device according to claim 1, wherein said device is adapted for teaching information as to United States Presidents, said question indicia comprise numerals connoting the ordinal number of the term of each of the Presidents, said proposed answer indicia comprise identification of the Presidents, and said verified answer indicia comprise true identification of the Presidents.
6. An educational device according to claim 1, wherein said spindle is comprised of two spindle members, a first spindle member mounted on said base and adapted to support said first disc, and a second spindle member adapted to engage said first spindle member and to support said second disc, and lock means adapted to lock said second spindle member to said first spindle member, thereby locking said first and second discs to said base.
7. An educational device according to claim 1, wherein said first and second discs are formed of polystyrene foam.
8. An educational device according to claim 1, wherein said tablet means are provided with proposed answer indicia comprising true indicia on one side and false indicia on the other side.
9. An educational device according to claim 1, wherein said device is mounted in a case having a cover and means for latching said cover to said case.

* * * * *